(12) United States Patent
Uribe et al.

(10) Patent No.: US 10,989,454 B2
(45) Date of Patent: Apr. 27, 2021

(54) EXPANSION VALVE AND VAPOUR COMPRESSION SYSTEM

(71) Applicant: Danfoss A/S, Nordborg (DK)

(72) Inventors: Sergio Uribe, Monterrey N.L. (MX); Johannes Cornelius Jacobus Van Beek, Almind (DK)

(73) Assignee: Danfoss A/S, Nordborg (DK)

( * ) Notice: Subject to any disclaimer, the term of this patent is extended or adjusted under 35 U.S.C. 154(b) by 45 days.

(21) Appl. No.: 15/765,771

(22) PCT Filed: Sep. 30, 2016

(86) PCT No.: PCT/EP2016/073432
§ 371 (c)(1),
(2) Date: Apr. 4, 2018

(87) PCT Pub. No.: WO2017/063902
PCT Pub. Date: Apr. 20, 2017

(65) Prior Publication Data
US 2018/0306474 A1    Oct. 25, 2018

(30) Foreign Application Priority Data

Oct. 14, 2015   (EP) ..................................... 15189681

(51) Int. Cl.
*F16K 31/00*     (2006.01)
*F16K 31/02*     (2006.01)
(Continued)

(52) U.S. Cl.
CPC ............ *F25B 41/31* (2021.01); *F16K 31/002* (2013.01); *F16K 31/025* (2013.01); *F25B 41/355* (2021.01); *Y02B 30/70* (2013.01)

(58) Field of Classification Search
CPC ............... F16K 31/002; F16K 31/025; F25B 2341/0651; F25B 41/062; Y02B 30/72
See application file for complete search history.

(56) References Cited

U.S. PATENT DOCUMENTS 3,613,732 A    10/1971  Willson et al.
3,835,659 A *   9/1974  McBride, Jr. ......... F16K 31/025
                                                         62/202
(Continued)

FOREIGN PATENT DOCUMENTS

CN    1182848 A    5/1998
CN    1721614 A    1/2006
(Continued)

OTHER PUBLICATIONS

International Search Report for Application No. PCT/EP2016/073432 dated Jan. 20, 2017.
(Continued)

*Primary Examiner* — Edward F Landrum
*Assistant Examiner* — Chang H Park
(74) *Attorney, Agent, or Firm* — McCormick, Paulding & Huber PLLC

(57) ABSTRACT

An expansion valve includes a valve element, a valve seat as well as a biasing member. The valve element and the valve seat are arranged in a first fluid passage of the expansion valve. The expansion valve further includes a shape memory alloy actuator that exerts a force on the valve element towards an open valve position when the shape memory alloy actuator is heated by an electric current. An expansion valve for a vapour compression system of the above type may be controlled externally but also be self-regulating. The shape memory alloy actuator is arranged in a second fluid passage of the expansion valve and the shape memory alloy actuator is in thermal contact with fluid in the second fluid passage, such that the shape memory alloy actuator actuates the valve element towards a closed valve position when the shape memory actuator is cooled by the fluid.

18 Claims, 4 Drawing Sheets

(51) Int. Cl.
  *F25B 41/31* (2021.01)
  *F25B 41/355* (2021.01)

(56) References Cited

U.S. PATENT DOCUMENTS

| | | |
|---|---|---|
| 4,750,520 A | 6/1988 | Heim et al. |
| 4,973,024 A | 11/1990 | Homma |
| 5,033,713 A | 7/1991 | Thorsen et al. |
| 5,211,371 A | 5/1993 | Coffee |
| 5,345,963 A | 9/1994 | Dietiker |
| 5,865,418 A | 2/1999 | Nakayama et al. |
| 6,742,761 B2 | 6/2004 | Johnson et al. |
| 6,843,465 B1 | 1/2005 | Scott |
| 7,073,332 B2 | 7/2006 | Butera et al. |
| 7,585,006 B2 | 9/2009 | Alacqua et al. |
| 7,815,161 B2 | 10/2010 | Saitoh et al. |
| 10,443,753 B2 * | 10/2019 | van Beek ............... F25B 41/062 |
| 2002/0171055 A1 | 11/2002 | Johnson et al. |
| 2003/0198558 A1 | 10/2003 | Nason et al. |
| 2009/0302708 A1 | 12/2009 | Takahashi |

FOREIGN PATENT DOCUMENTS

| | | |
|---|---|---|
| CN | 101135387 A | 3/2008 |
| CN | 103629409 A | 3/2014 |
| DE | 19934827 C1 | 5/2001 |
| EP | 0841510 A1 | 5/1998 |
| EP | 1548342 A1 | 6/2005 |
| EP | 2946108 B1 | 3/2017 |
| JP | 61019368 A | 1/1986 |
| JP | H08320171 A1 | 12/1996 |
| JP | 2007-24486 A | 2/2007 |
| JP | 2009-250590 A1 | 10/2009 |
| WO | 95/02143 A1 | 1/1995 |
| WO | 2010132997 A1 | 11/2010 |
| WO | 2010142997 A1 | 12/2010 |
| WO | 2012106415 A1 | 8/2012 |
| WO | 2014/111397 A1 | 7/2014 |

OTHER PUBLICATIONS

International Search Report for Serial No. PCT/EP2014/050653 dated Mar. 7, 2014.
Article Entitled "Fabrication of Nitinol Materials and Components" by Wu. Ming H. Memry Corporation, Bethel, CT (8 pages).

* cited by examiner

EXPANSION VALVE AND VAPOUR COMPRESSION SYSTEM

CROSS-REFERENCE TO RELATED APPLICATIONS

This application is a National Stage application of International Patent Application No. PCT/EP2016/073432, filed on Sep. 30, 2016, which claims priority to European Patent Application No. 15189681.8, filed on Oct. 14, 2015, each of which is hereby incorporated by reference in its entirety.

TECHNICAL FIELD

The invention relates to an expansion valve comprising a valve element, a valve seat as well as a biasing member, that exerts a force on a valve element towards a closed valve position, wherein the valve element and the valve seat are arranged in a first fluid passage of the expansion valve, and wherein the expansion valve further comprises a shape memory alloy actuator that exerts a force on the valve element towards an open valve position when the shape memory alloy actuator is heated by an electric current.

The invention also relates to a vapour compression system comprising an expansion valve of the above mentioned type.

BACKGROUND

Vapour compression systems, such as refrigeration systems, air conditioning systems or heat pumps, usually comprise a compressor, a condenser, as well as an expansion device for example an expansion valve, and an evaporator that are arranged in a cycle. A refrigerant circulates within the cycle and is compressed and expanded in an alternating manner. The heat exchange takes place in the condenser and the evaporator parts of the vapour compression system, whereby cooling or heating may be provided depending on the use of the vapour compression system.

In the following the operation of a vapour compression system is explained with reference to a refrigeration system. The compressor compresses the refrigerant fluid to a high pressure hot gas that is guided into the condenser, where the gas condenses to a high pressure liquid and transfers heat to the environment. Afterwards the high pressure liquid is led into the expansion valve, that limits the flow of refrigerant to the following evaporator, thereby reducing the pressure of the refrigerant. The resulting low pressure liquid then evaporates in the evaporator, whereby heat from the environment is absorbed.

In order to optimize the efficiency of the refrigeration system, the stream of fluid into the evaporator therefore needs to be controlled accurately. It is usually preferred if no liquid refrigerant remains and exits the evaporator, i.e. all refrigerant has evaporated or else liquid refrigerant may enter the following compressor, which may severely damage the compressor. If the evaporator is running at full cooling capacity the fluid exiting the evaporator will have nearly the same temperature, whether or not the amount of liquid is zero or small (at a correct opening degree of the expansion valve) or if the amount of liquid is large (expansion valve too far open). This is because the refrigerant does not change temperature when changing phase from liquid to gas. This means, that it is not possible to distinguish by a passive temperature measurement whether the opening degree of the expansion valve is anywhere between correct or fully open. On the other hand, if the amount of refrigerant is lowered too much, all refrigerant in the evaporator is quickly evaporated and the amount of cooling provided is limited. It is thus important to control the amount of refrigerant passing through the expansion valve. Thus the used expansion valves are usually proportional valves and not simple on-off valves.

An expansion valve of the above mentioned type is for example known from WO 2014/111397 A1. Therein the expansion valve comprises a shape memory alloy actuator to actuate the expansion valve. The shape memory alloy actuator is arranged in an encapsulation separated from the refrigerant passage. The SMA actuator may be provided with an electric current, whereby the actuator is heated and shortens in length. The actuator thereby opens the valve against the force of the biasing member.

From JP 2007024486 another expansion valve using shape memory alloy actuators is known. The expansion valve comprises two fluid passages, one of which houses the valve element and the valve seat. A first shape memory alloy spring as well as a regular spring bias the valve element towards a closing direction of the valve. If the temperature of expanded fluid behind the valve seat rises, the first shape memory alloy spring elongates and throttles the flow of refrigerant into the evaporator. A second shape memory alloy spring is arranged in a second fluid passage way connected to the evaporator outlet. The second shape memory alloy spring elongates if the outlet temperature of the refrigerant from the evaporator rises and thereby exerts a force on the valve element towards a more open position of the valve. Consequently the resulting expansion valve is self-regulating within a limited range of operation.

Further valves of the kind mentioned at the outset are known from U.S. Pat. No. 4,973,024 A as well as WO 95/02143.

The above expansion valves have a number of disadvantages. In case of WO 2014/111397 A1 the valve needs to be constantly readjusted depending on the state of the refrigerant exiting the evaporator for example by a control unit. The control unit needs to be supplied with measurements for example of the temperature of the refrigerant exiting the evaporator outlet in order to readjust the opening degree of the expansion valve. The valve according to JP 2007024486 may on the other hand in some cases allow a self-regulation of the expansion valve, whereby the cost of the vapour compression system may be reduced. However, this expansion valve does not allow to control the flow of the refrigerant other than controlling it at one desired level. For example, it is not possible to increase or decrease the amount of refrigerant flowing into the evaporator to increase or reduce the amount of cooling provided by the refrigeration system by readjusting the expansion valve.

SUMMARY

The object of the present invention is therefore to provide an expansion valve and a vapour compression system of the types mentioned initially that may be controlled externally but are also self-regulating.

This task is solved in an expansion valve of the above mentioned type in that the shape memory alloy actuator is arranged in an second fluid passage of the expansion valve, wherein the shape memory alloy actuator is arranged to be in thermal contact with a fluid in the second fluid passage, such that the shape memory alloy actuator also actuates the valve element towards a closed valve position when the shape memory alloy actuator is cooled by a fluid in the second fluid passage.

With this solution the expansion valve will on the one hand be partially self-regulating, i.e. the expansion valve readjusts its opening degree depending on how much the shape memory alloy actuator is cooled by the fluid in the second fluid passage. To this end the shape memory alloy actuator is arranged in a second fluid passage preferably with no thermal or liquid contact to the first passage. This second fluid passage may then be connected to an outlet of an evaporator, such that the shape memory alloy actuator comes in thermal contact with the refrigerant exiting the evaporator and may thus react to a change in temperature by shortening (when the refrigerant temperature rises) or elongating (when the refrigerant temperature drops or the amount of liquid refrigerant increases). When the shape memory alloy actuator shortens, a force is applied on the valve element towards a more open valve position and more refrigerant is allowed to pass the valve seat. This way, the temperature in the second fluid passage will drop because more refrigerant is provided into the evaporator. The expansion valve is thus to some extend self-regulating. Furthermore, when liquid refrigerant enters the second passage, too much refrigerant is provided to the evaporator, and the shape memory alloy actuator will be cooled primarily by evaporation of liquid droplets on the shape memory alloy actuator. Consequently, the shape memory alloy actuator will elongate and apply a force on the valve element towards a more closed valve position thereby throttling the amount of refrigerant passing the valve seat. Thus the expansion valve can also prevent the occurrence of excessive liquid refrigerant on the evaporator outlet which may otherwise enter the compressor. The expansion valve thus allows to run the evaporator very close to optimal cooling without the risk of damage to the compressor.

At the same time, the electric current provided to the shape memory alloy actuator may also be increased/decreased to actively open/close the expansion valve to increase/decrease the amount of cooling provided. The amount of power necessary for heating the shape memory alloy actuator is rather low, because the shape memory alloy actuator will ideally only be in contact with gaseous refrigerant. A control unit, preferably a microcomputer may be provided to control the electric current provided to the shape memory alloy actuator.

In a preferred embodiment the valve element, the valve seat and the shape memory alloy actuator are arranged in a common valve housing, that comprises at least two inlets and at least two outlets. This solution allows for a compact construction of the expansion valve.

In a further preferred embodiment the valve housing primarily extends in a direction perpendicular to both fluid passages. The valve housing may thus have a larger extend perpendicular to both fluid passages than parallel to the fluid passages. This construction allows to provide a sufficiently large space for the shape memory alloy actuator. In this case the shape memory alloy actuator may preferably have an elongated form, and may preferably comprise at least one linear shape memory alloy wire.

It is also preferred if the shape memory alloy actuator comprises at least one U-shaped wire. This may reduce the amount of power necessary for heating the shape memory alloy actuator. Furthermore, using at least one U-shaped wire will also improve the mechanical stability of the shape memory alloy actuator.

In a further preferred embodiment the shape memory alloy actuator is in direct contact with the fluid in the second fluid passage. In this case, no insulation or coating is provided around the shape memory alloy actuator. This allows for a faster reaction of the shape memory alloy actuator to any temperature change in the second passage or the occurrence of liquid refrigerant. Since the shape memory alloy actuator will mostly be in contact with gaseous refrigerant, an electric insulation or corrosion protection may thus be dispensed with. Nevertheless the material of the shape memory alloy actuator may need to be adapted to the used refrigerant. The shape memory alloy actuator preferably is attached to the housing through an electrically insulating seal, e.g. a glass seal, if the housing is electrically conductive, e.g. comprises metal parts.

Preferably the valve element comprises a throttling element with a conical throttling tip. Thereby, a better proportional control of the flow through the expansion valve is achieved.

The above mentioned task is also solved by a vapour compression system comprising an expansion valve according to any of the above mentioned embodiments as well as an evaporator, wherein the first fluid passage is connected to the evaporator inlet and the evaporator outlet is connected to the second fluid passage.

In the resulting vapour compression system the expansion valve may thus regulate the amount of refrigerant provided to the evaporator with the use of a shape memory alloy actuator that reacts to changes in temperature or state of the refrigerant exiting the evaporator into the second fluid passage of the expansion valve. The state of the refrigerant in the context of this application denotes the phase composition of the refrigerant, e.g. fully gaseous, mixture of gas and liquid or fully liquid. The amount of refrigerant passing through the valve seat is adjusted by shortening or elongating the shape memory alloy actuator in reaction to the heat balance of refrigerant cooling and heat resulting from the electric current. Consequently, the opening position of the valve element with respect to the valve seat is readjusted.

In a further preferred embodiment the biasing force of the biasing member is equal but with opposite direction to the net pressure force acting on the valve element by the pressure difference between first fluid passage and the second fluid passage in the closed position of the valve. Consequently, the expansion valve is pressure balanced, meaning that the shape memory alloy actuator only needs to overcome friction forces but does not need to completely overcome the force of the biasing member. Thus the shape memory alloy actuator does not need to provide a too large force to displace the valve element, and may thus be constructed with the use of less material. At the same time the amount of power that is necessary for actuating the shape memory alloy actuator may also be reduced.

The above mentioned task is also solved by a method for controlling a vapour compression system according to any of the above mentioned embodiments, comprising the following steps:
providing an electric current to the shape memory alloy actuator to heat the shape memory alloy actuator above the temperature of the fluid in the second fluid passage,
adjusting the electric current to control the state of the refrigerant entering the second fluid passage.

According to the control method the shape memory alloy actuator will thus be constantly heated to a temperature above the refrigerant temperature. This way, the shape memory alloy actuator can both "sense" temperature changes in the refrigerant as well as changes in the refrigerant state, e.g. the occurrence of liquid droplets that cool the shape memory alloy actuator via evaporative cooling. The temperature range to which the shape memory alloy actuator will be heated during operation is however mostly determined by the phase transition temperature of the shape memory alloy material between austenitic and martensitic phase. Therefore, the refrigerant and the material of the shape memory alloy actuator need to be chosen such that the phase transition temperature of the shape memory alloy material is sufficiently above the phase transition temperature of the refrigerant. The electric current provided to the shape memory alloy actuator is adjusted to control the state of the refrigerant entering the second fluid passage. Since the power provided is a relevant quantity for heating the shape memory alloy actuator, the power can be controlled by controlling the current at constant voltage. The electric current may thus be adjusted in such a way that the phase composition of the refrigerant entering the second fluid passage is mostly gaseous and only contains a small amount of liquid refrigerant. With such a state of the refrigerant the evaporator may be operated at optimal efficiency. Operating a vapour compression system at a low superheat with a mixed state refrigerant was problematic in the state of the art because the fraction of liquid in the refrigerant could not be properly controlled since the superheat is constant in the mixed state. With the present invention the state of the refrigerant can however be accurately controlled and the danger of a liquid stroke of the compressor can be avoided.

In a preferred embodiment the electrical resistance of the shape memory alloy actuator is calculated from the measured electric current provided to the shape memory alloy actuator at constant voltage. If the temperature of the shape memory alloy actuator changes, the electrical resistance changes, which in turn can be measured by a change in electrical current at constant voltage. This is important to ensure that the shape memory alloy actuator does not overheat if a too large current is provided. On the other hand it can be ensured that the temperature of the shape memory alloy actuator stays in the range of temperature around the phase transition in the shape memory alloy material.

In a further preferred embodiment the electric current provided to the shape memory alloy actuator is adjusted to keep the resistance of the shape memory alloy actuator constant at a desired value. The electrical current may thus be adjusted such that the electrical resistance returns to the or stays at the desired value meaning that the temperature of the shape memory alloy actuator and in turn the opening degree of the expansion valve is controlled to maintain a desired refrigerant state.

It is preferred if the vapour compression system comprises a control unit that measures the resistance of the shape memory alloy actuator and provides the electric current for heating the shape memory alloy actuator. The resistance of the shape memory alloy actuator is temperature dependent. Therefore, if the voltage provided to the shape memory alloy actuator is kept constant, a change in current will directly indicate a change in electric resistance of the shape memory alloy actuator. This in turn allows to calculate the present temperature of the shape memory alloy actuator.

Preferably a hysteresis compensation is included when calculating the adjusted electric current from the measured resistance of the shape memory alloy actuator. The development over time of the resistance of the shape memory alloy actuator will therefore be taken into account when calculating the adjusted electric current to be provided to the shape memory alloy actuator. The hysteresis compensation can preferably be performed by a control unit.

It is furthermore preferred if the electrical resistance of the shape memory alloy actuator is varied around the value of the electrical resistance of the shape memory alloy actuator at the phase transition from martensitic to austenitic phase. Since the electrical resistance of the shape memory alloy actuator is only a function of the temperature as well as the temperature evolution of the shape memory alloy actuator for any given actuator one may thus ensure that the temperature of the shape memory alloy actuator stays within the desired operation parameters. For example, one may ensure that the temperature of the shape memory alloy actuator does not become too high to prevent overheating of the shape memory alloy actuator. On the other hand one can also ensure that the shape memory alloy actuator stays within the temperature range in which the phase transition from austenitic to martensitic phase occurs without having to measure the temperature of the shape memory alloy actuator directly. The range in which the resistance of the shape memory alloy actuator is varied may of course take into account the temperature evolution of the shape memory alloy actuator to compensate for a possible hysteresis in the temperature dependence of the electrical resistance.

In a preferred embodiment the shape memory alloy actuator actuates the valve element to a more open position if the temperature of the fluid entering the second passage from the evaporator rises while the electrical power provided to the shape memory alloy actuator is kept constant.

It is also preferred if the shape memory alloy actuator actuates the valve element to a more closed position if the temperature of the fluid entering the second passage from the evaporator drops while the electrical power provided to the shape memory alloy actuator is kept constant.

In a further preferred embodiment the shape memory alloy actuator actuates the valve element to a more closed position if any liquid enters the second fluid passage from the evaporator. If liquid refrigerant enters from the evaporator into the second fluid passage the evaporator is over-provided with refrigerant, i.e. the expansion valve position is too far open. The liquid refrigerant will lead to a faster cooling of the shape memory alloy actuator, which consequently elongates and throttles the amount of fluid passing through the valve seat.

BRIEF DESCRIPTION OF THE DRAWINGS

The invention will hereafter be described with reference to the drawings, where.

DETAILED DESCRIPTION

Figure 1:
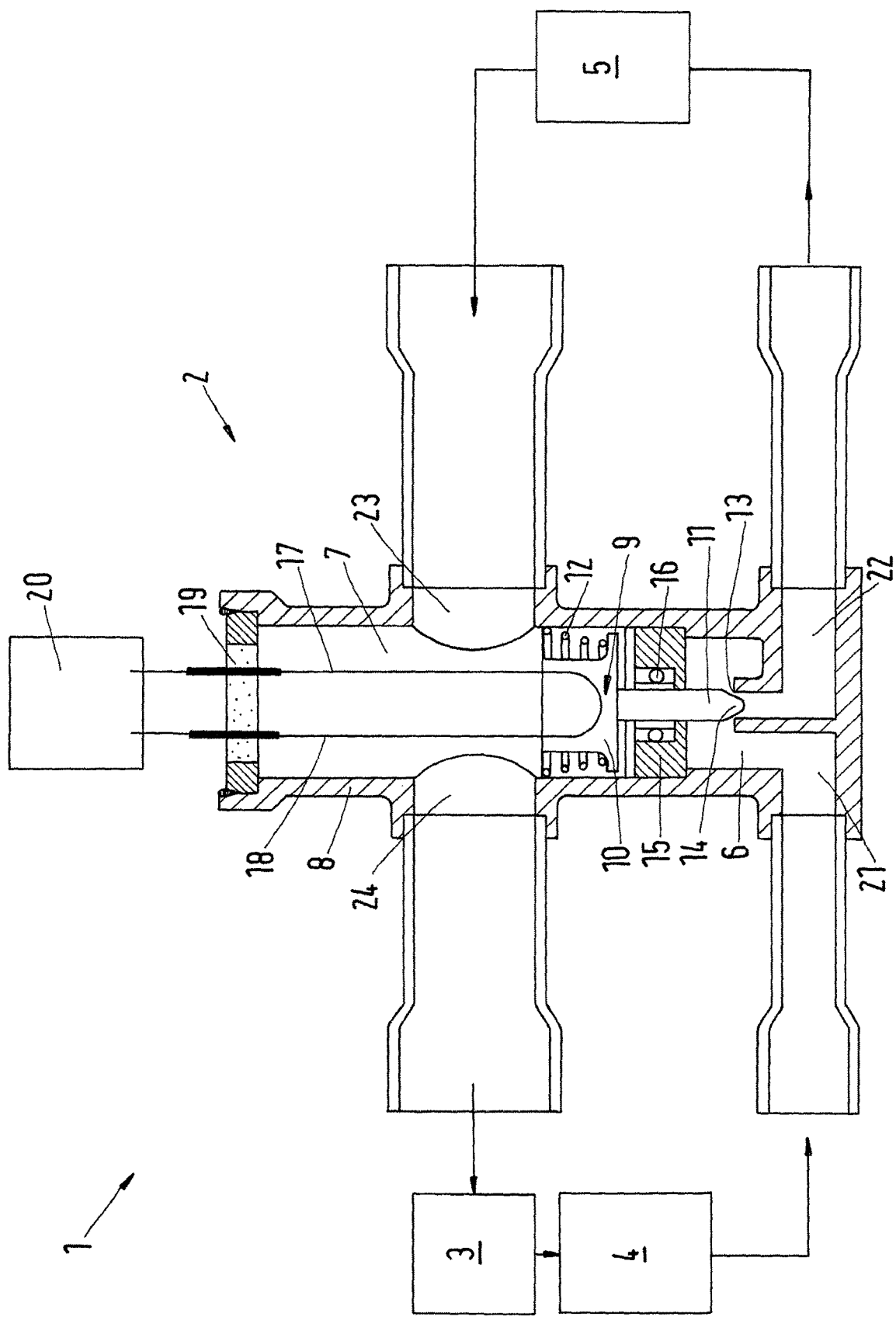
FIG. 1 shows an expansion valve as well as a vapour compression system according to the invention.
Figure 2:
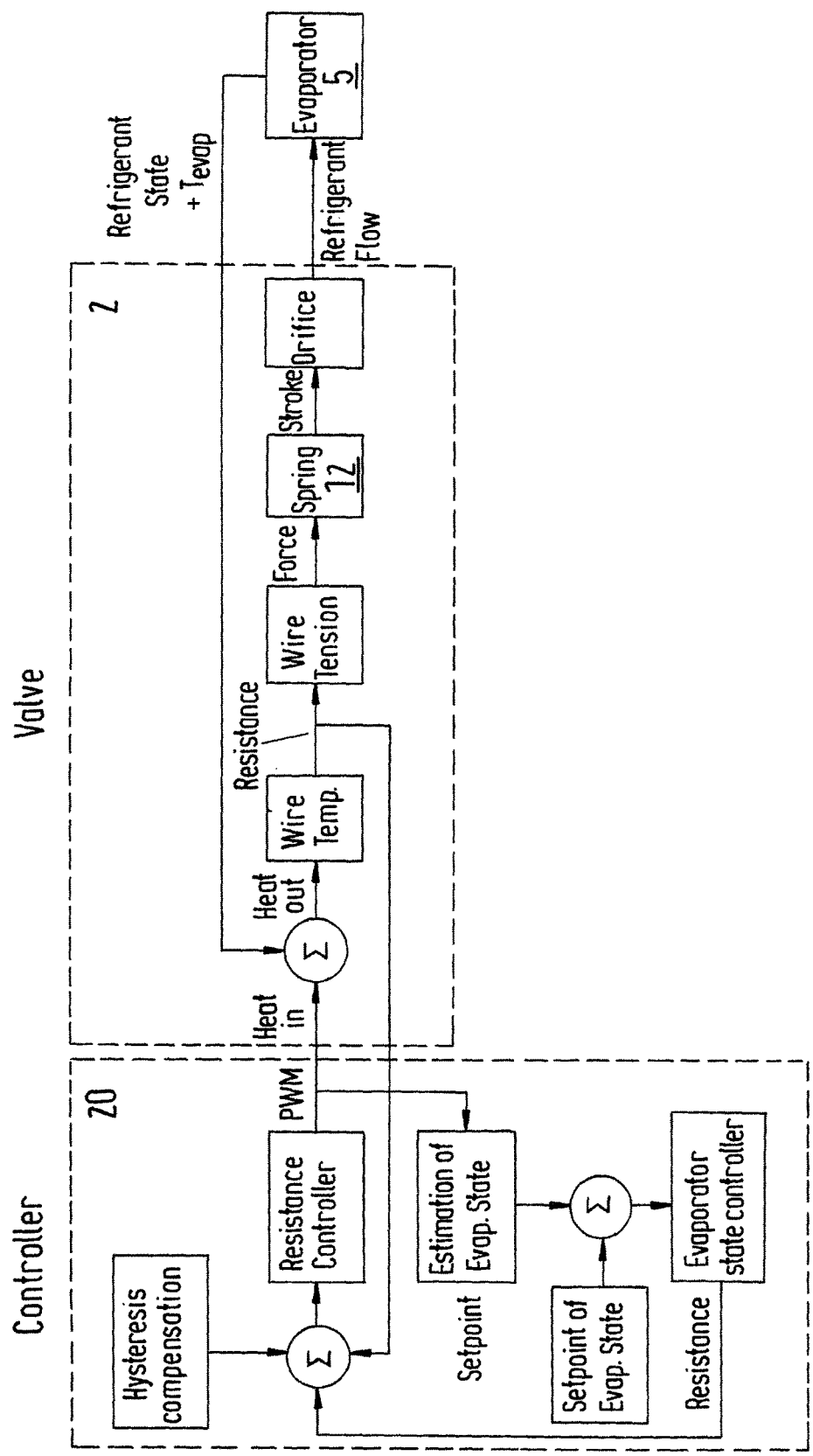
FIG. 2 shows a method according to the invention in a flow chart, FIGS. 3+4 show lab results of a test run of a vapour compression system according to the invention.

FIG. 1 shows a vapour compression system 1 as well as an expansion valve 2 according to the invention, while FIG. 2 shows the method according to the invention in a flow chart. The vapour compression system 1 furthermore comprises a compressor 3, a condenser 4 as well as an evaporator 5.

The expansion valve 2 comprises a first fluid passage 6 as well as a second fluid passage 7, both of which are arranged in a common valve housing 8. The expansion valve 2 furthermore comprises a valve element 9 that extends both into the first fluid passage 6 as well as into the second fluid passage 7. The valve element 9 comprises a valve member 10 as well as a throttling element 11. A biasing member 12, in this case a spring, exerts a force on the valve element 9 towards a closed valve position. The expansion valve 2 is in a closed position if the throttling element 11 engages a valve seat 13 in the first fluid passage 6. The valve seat 13 is in this case engaged by a conical throttling tip 14 of the throttling element 11.

The throttling element 11 extends through a separation member 15 comprising a seal 16 that prevents fluid contact between the first fluid passage 6 and the second fluid passage 7. In the second fluid passage 7 a shape memory alloy actuator 17 is arranged comprising one shape memory alloy wire 18. Here the wire 18 is U-shaped, meaning the wire 18 enters the valve member 10, changes direction gradually by 180° and then exits the valve member 10 again. The shape memory alloy actuator 17 could however also comprise a larger number of shape memory alloy wires, for example another U-shaped wire.

The shape memory alloy actuator 17 is connected to the valve element 9, in this case by being connected to the valve member 10. The shape memory alloy actuator 17 is introduced into the housing 8 through a glass seal 19 that electrically insulates the shape memory alloy actuator 17 from the housing 8. The shape memory alloy actuator 17 is connected to a control unit 20, preferably a microcomputer, located outside of the valve housing 8. The control unit 20 provides a current to the shape memory alloy actuator 17 in order to heat it. When the temperature of the shape memory alloy actuator 17 increases the length of the shape memory alloy actuator 17 shortens whereby a force is exerted on the valve element 9 in a direction away from the valve seat 13. This way, the expansion valve 2 may be directly controlled by the control unit 20 according to external instructions, for example because of an increased or reduced cooling demand of the vapour compression system 1. Furthermore, the control unit 20 compensates non-linear characteristics of the shape memory alloy actuator 17 and linearizes these characteristics. For example, the control unit 20 may compensate for the non-linear temperature dependence of the resistance of the shape memory alloy actuator 17.

The control unit 20 may compensate for a possible hysteresis in the temperature dependence of the electrical resistance of the shape memory alloy actuator 17. In other words, the control unit 20 may take into account the time dependent evolution of the temperature and resistance of the shape memory alloy actuator 17 when calculating an adjusted electrical current to be provided to the shape memory alloy actuator 17. The temperature dependence of the resistance differs depending on whether the temperature drops or rises.

During operation the shape memory alloy actuator 17 will preferably always be heated to a temperature well above the refrigerant temperature in the second fluid passage 7. If $CO_2$ is used as a refrigerant the preferred temperature range to which the shape memory alloy actuator is heated during operation is 70° to 90° Celsius. This temperature range is of course dependent on the material of the shape memory alloy actuator that is chosen. In particular, the temperature range is determined by the phase transition between austenitic and martensitic phase in the shape memory alloy material. The typical refrigerant temperature of $CO_2$ in this case would be far lower, for example in a range of −10° to −5° Celsius. The temperature of the refrigerant exiting the evaporator is however among others dependent on the choice of refrigerant, the pressure of the refrigerant and the amount of superheat.

Furthermore, the expansion valve 2 will also be partially self-regulating. High pressure refrigerant enters the expansion valve 2 through a first inlet 21 into the first fluid passage 6. The limited size of the opening between the throttling element 11 and the valve seat 13 then limits the amount of refrigerant flow through the expansion valve towards the evaporator 5. Thereby, the pressure of the refrigerant is reduced before it passes into the evaporator 5 through a first outlet 22. Inside the evaporator 5 the refrigerant then evaporates absorbing heat from the environment and then is passed on into a second inlet 23 into the second fluid passage 7.

Depending on the amount of refrigerant that is provided into the evaporator 5 the temperature of the gaseous refrigerant passing into the second fluid passage 7 will be higher or lower. In particular if the amount of refrigerant provided is too low, the refrigerant temperature will rise and the hot refrigerant will come into thermal contact with the shape memory alloy actuator 17. Thereby, the shape memory alloy actuator 17 is heated and will shorten in length. Consequently, a force will be exerted on the valve element 9 in an outward direction away from the valve seat 13, thereby increasing the flow through the valve seat 13. The resulting increase in refrigerant flow into the evaporator 5 will reduce the heat of the refrigerant exiting out of the evaporator into the second fluid passage way thereby again influencing the shape memory alloy actuator 17. The expansion valve will therefore be able to compensate an increase or decrease in the amount of required cooling of the vapour compression system 1 even without an external control signal.

However, if the vapour compression system 1 is already operating at maximum capacity the evaporator will be fully flooded with refrigerant. In this case a further increase in refrigerant being led into the evaporator will not result in a larger amount of refrigerant being evaporated in the evaporator. Instead, parts of the refrigerant exiting the evaporator into the second fluid passage 7 will remain liquid. The mixture of gaseous and liquid refrigerant exiting the evaporator will however almost have the same temperature compared to a case where the evaporator is running at optimal cooling and no liquid refrigerant exits the evaporator. Therefore, it was previously difficult to find the optimal opening degree of an expansion valve of a vapour compression system during operation. Consequently the vapour compression system either needed to be run at below maximum capacity or there was a risk of liquid refrigerant exiting the evaporator and possibly damaging the compressor. The present invention however solves this problem with the provided expansion valve, vapour compression system and method for controlling the vapour compression system by allowing to also indirectly measure and react to the composition of the refrigerant exiting the evaporator. Therefore, the vapour compression system can be run at no or very little super heat, i.e. the evaporator will be provided with the maximum amount of refrigerant that can be evaporated in the evaporator while not risking the occurrence of any significant amount of excessive refrigerant that would exit the evaporator in liquid form.

After the refrigerant passes through the second fluid passage 7 it will exit through a second outlet 24 into the compressor 3 restarting the vapour compression cycle, i.e. here the refrigeration cycle.

The resulting expansion valve 2 and vapour compression system 1 therefore on the one hand are self-regulating because the shape memory alloy actuator 17 allows the expansion valve 2 to react to environmental changes resulting for example in an increased cooling demand without the need for external control. At the same time, if the cooling or heating demand of the vapour compression system needs to be readjusted the control unit 20 can adjust the desired resistance of the shape memory alloy actuator 17 to increase or decrease the amount of refrigerant flow through the expansion valve, thereby increasing or decreasing the amount of cooling or heating provided by the vapour compression system.

FIG. 2 shows the control method according to the invention in a flow diagram. The control unit 20 provides a preferably pulse-width modulated, electrical current to the shape memory alloy actuator 17. The shape memory alloy wire is thereby heated to a certain temperature above the refrigerant temperature.

The electrical resistance of the shape memory alloy wire is monitored by the control unit 20. A change in temperature of the shape memory alloy wire results in a change in electrical resistance. At constant voltage a change in electrical current thus allows to calculate a change in electrical resistance of the shape memory alloy wire.

A change in shape memory alloy wire temperature will also result in an elongation (at dropping temperature) or a shortening (at increased temperature). Consequently, the shape memory alloy wire tension will change, which will bring the force equilibrium between the wire tension and the force of the biasing member 12 (e.g. the spring) out of balance and lead to a change in stroke of the valve element 9.

A change in stroke of the valve element 9 will then increase or decrease the opening degree of the expansion valve 2. This in turn will change the flow of refrigerant into the evaporator 5. The temperature and state of the refrigerant exiting the evaporator 5 will then influence the shape memory alloy wire temperature as indicated by the upper arrow originating from the evaporator 5.

The state of the evaporator 5, e.g. temperature and state of the refrigerant, will then be estimated in the control unit 20. The control unit 20 calculates an estimation of the evaporator state from the current provided to the wire to calculate how the resistance of the shape memory alloy wire needs to be adjusted when compared to a desired evaporator state set point. This way variations in the refrigerant state can be compensated to ensure that the correct amount of refrigerant enters the evaporator such that only a small amount of liquid refrigerant will exit the evaporator to enter the second fluid passage if this is the object. The control unit 20 can however also maintain other refrigerant states at the evaporator outlet, e.g. no liquid, if desired. This depends on the chosen set point.

Operating the vapour compression system 1 at optimal performance will require to run the evaporator 9 with the maximum amount of refrigerant, that can be evaporated in the given evaporator. At this point there is no direct temperature change anymore in the gaseous refrigerant exiting the evaporator if the expansion valve 2 is opened even more. Instead, parts of the refrigerant will not be evaporated in the evaporator and liquid droplets will imping and evaporate from the shape memory alloy wire leading to additional cooling by evaporation. Thus, the required power necessary to keep the expansion valve 2 at a certain opening degree will also depend on the state of the refrigerant exiting the evaporator 5. The evaporator state can consequently be controlled, even if the superheat is reduced to a point where liquid droplets appear at the evaporator outlet. Small amounts of liquid refrigerant at the evaporator outlet may not automatically cause a problem during operation because in many cases the distance of the compressor from the evaporator is sufficiently long that smaller amounts of liquid can still evaporate on the way to the compressor.

The control unit 20 will preferably perform a hysteresis compensation on the desired electrical resistance to take into account that the temperature dependence of the electrical resistance of the shape memory alloy wire depends on the previous temperature of the shape memory alloy wire to a certain extend. This hysteresis compensation greatly improves the accuracy of the control method and reduces unnecessary variations in the electrical current provided to the expansion valve 2.

Figure 3:
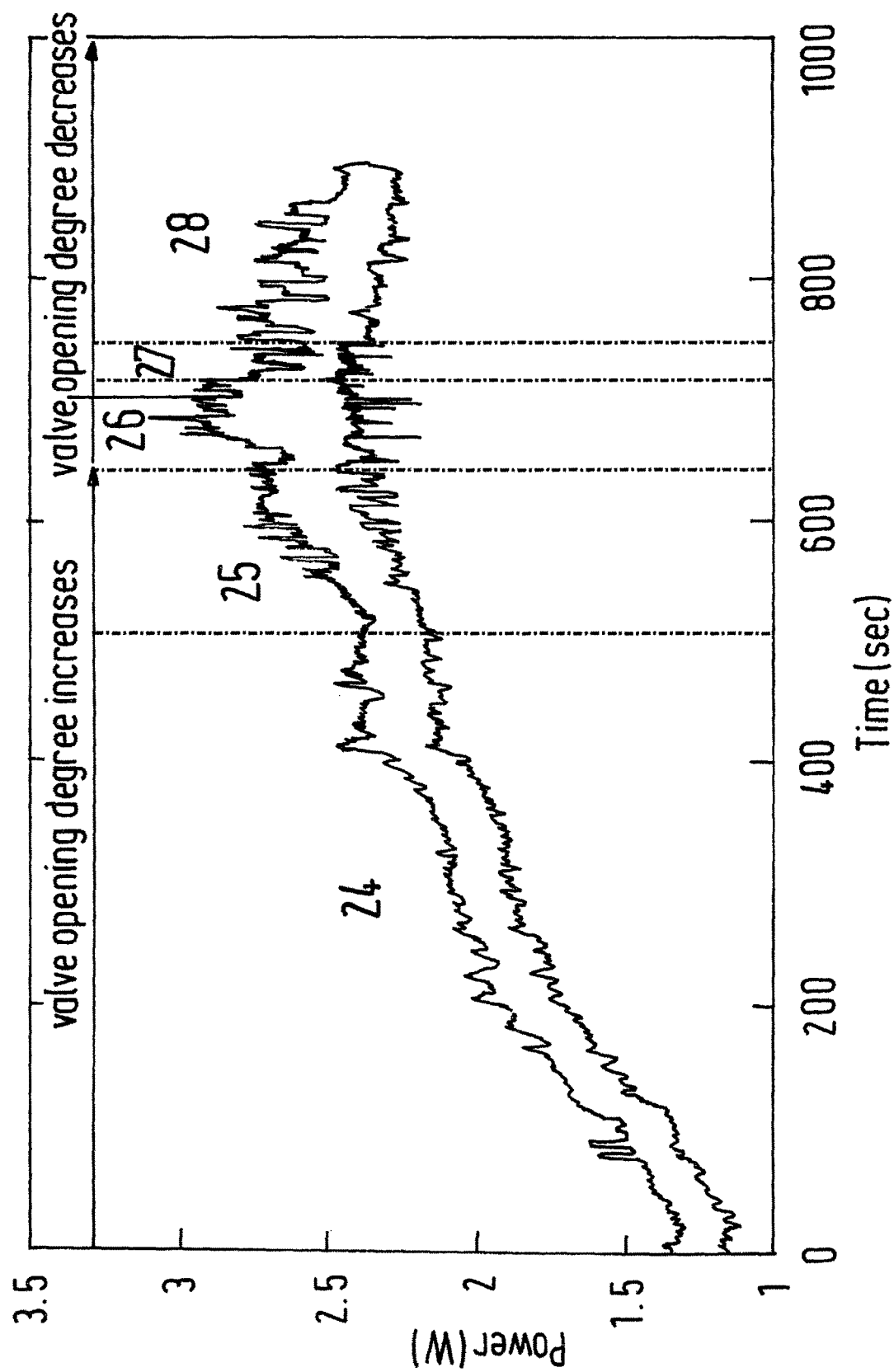
Figure 4:
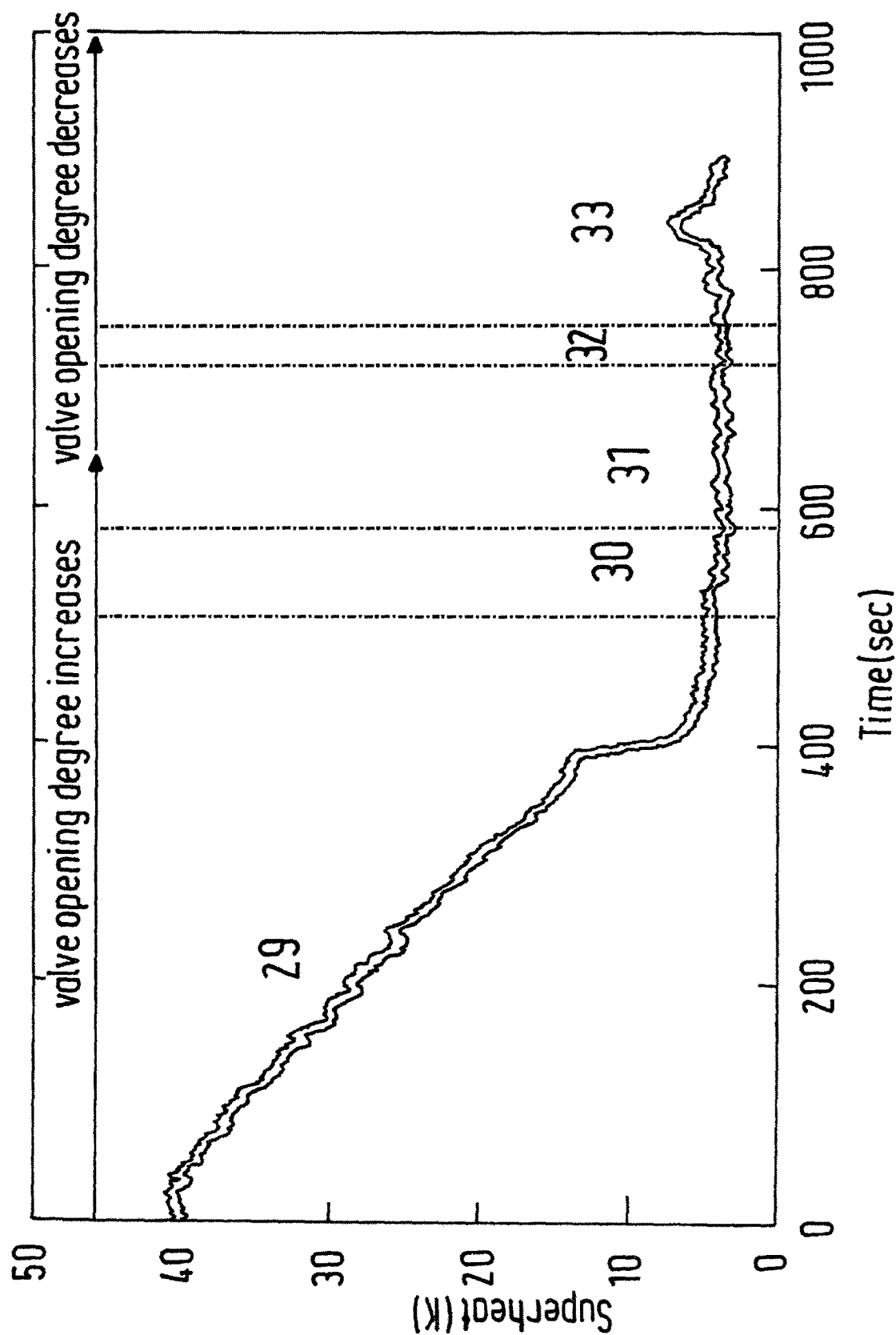

FIGS. 3 and 4 show a test run of a vapour compression system 1 according to the invention. FIG. 3 shows the electrical power provided to the shape memory alloy actuator over time, while FIG. 4 shows the superheat of the refrigerant at the evaporator outlet measured during the same time by a direct temperature measurement. Both FIGS. 3 and 4 show variation bands in which the power or the superheat varies. Note that a direct measurement of the superheat temperature is not necessarily part of the control method as explained above, but it is helpful to clarify the problem of vapour compression systems that are being run at low superheat. Superheat in Kelvin here denotes the temperature of the refrigerant above the temperature of the phase transition of the refrigerant from gas to liquid, where in this case $CO_2$, also referred to as R-404A, has been used as refrigerant. In FIGS. 3 and 4 the segments of different phase composition of the refrigerant are separated by vertical dot-dashed lines.

During the test run, the desired value for the electrical resistance of the shape memory alloy wire is continuously adjusted to increase the amount of refrigerant provided to the evaporator 5 through the expansion valve 2. The segment 24 denotes that only gaseous refrigerant is present in the second fluid passage, while the electrical power provided to the shape memory alloy actuator is increased. The variations in the power curve are in part due to the delayed reaction of the vapour compression system 1 to any change in provided refrigerant and the resulting "overshooting" in the response of the control unit 20 by adjusting the provided electrical current to achieve the desired value of the temperature dependent electrical resistance. The amount of variation in the power is however also a measure of the refrigerant composition, since liquid droplets cooling the shape memory alloy wire by evaporative cooling will lead to a much faster change in shape memory alloy actuator wire temperature and electrical resistance than by thermal conduction to gaseous refrigerant alone. The control unit 20 can measure the variance and/or the standard deviation of the electrical power provided to the shape memory alloy actuator to deduce the refrigerant phase composition. This can be seen in the segment 25 where a mixture of gas and liquid refrigerant is present in the second fluid passage and the fraction of liquid phase to gas phase increases over time.

One can see, that the variations around the mean power increase once the fraction of liquid refrigerant becomes larger and finally is 100% in the segment 26.

Under normal operation such a flooding with liquid refrigerant would most likely lead to a so called "liquid stroke" in the compressor, severely damaging or destroying it.

After about 650 seconds the control unit 20 reduces the provided electrical power by adjusting the electrical resistance until the refrigerant composition changes to a mixed phase in the segment 27 and then back to purely gaseous refrigerant in the segment 28.

FIG. 4 shows an additional measurement of the superheat in Kelvin of the refrigerant exiting the evaporator measured at the same time as the power in FIG. 3. In the segment 29, the refrigerant is completely gaseous, as in the segment 33. Similarly, in segment 30 and 32 the refrigerant is in a mixed liquid/gas state and during the segment 31 the refrigerant is fully liquid. The graph shows that at time=0 the refrigerant is fully gaseous and has a temperature of about 40 K over the phase transition temperature. Thus, the superheat is relatively large and the evaporator cooling capacity is only partially used. While the valve opening degree is increased by the increase in provided electrical power to the shape memory alloy actuator, the refrigerant gas is less and less additionally heated after evaporating in the evaporator 5. At 400 sec time the superheat suddenly drops to about 5 K which is caused by the finite size and non-linear behavior of the evaporator 5. From 400 sec on the superheat stays practically constant even when the composition of the refrigerant completely changes from gas to fully liquid later on. This shows the main problem of vapour compression systems according to the state of the art, namely that the superheat of the refrigerant alone is not a reliable measure of the evaporator state or the state of the refrigerant. Vapour compression systems in the state of the art are therefore usually operated at a higher superheat (in this case it could be more than 10 K) to ensure that no large amounts of liquid can accidently enter the compressor during operation since one cannot directly determine the refrigerant composition from the temperature of the refrigerant when the evaporator is fully flooded with refrigerant. In turn this has the disadvantage, that the cooling capacity of the evaporator could not be fully used, reducing the performance and increasing the operation costs of the vapour compression system.

The expansion valve, the vapour compression system and the corresponding control method according to the invention now allows to operate a vapour compression system at very little superheat and thus close to optimal performance without any danger of a liquid stroke since the vapour compression system can also "sense" the composition of the refrigerant as described above.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. An expansion valve comprising a valve element, a valve seat as well as a biasing member, that exerts a force on the valve element towards a closed valve position, wherein the valve seat is arranged in a first fluid passage of the expansion valve, and wherein the expansion valve further comprises a shape memory alloy actuator that exerts a force on the valve element towards an open valve position when the shape memory alloy actuator is heated by an electric current, wherein, the shape memory alloy actuator is arranged in a second fluid passage of the expansion valve, wherein the shape memory alloy actuator is arranged to be in thermal contact with a fluid in the second fluid passage, such that the shape memory alloy actuator also actuates the valve element towards a closed valve position when the shape memory alloy actuator is cooled by a fluid in the second fluid passage, and wherein the shape memory alloy actuator is shaped such that the shape memory alloy actuator enters the valve element, changes direction 180°, and exits the valve element.

2. The expansion valve according to claim 1, wherein, the valve element, the valve seat and the shape memory alloy actuator are arranged in a common valve housing that comprises at least two inlets and at least two outlets.

3. The expansion valve according to claim 2, wherein, the valve housing extends primarily in a direction perpendicular to a direction of flow through the inlets and outlets of both fluid passages.

4. The expansion valve according to claim 3, wherein, the shape memory alloy actuator is in direct contact with the fluid in the second fluid passage.

5. The expansion valve according to claim 2, wherein, the shape memory alloy actuator is in direct contact with the fluid in the second fluid passage.

6. The expansion valve according to claim 2, wherein, the valve element comprises a throttling element with a conical throttling tip.

7. The expansion valve according to claim 1, wherein, the shape memory alloy actuator comprises at least one U-shaped wire.

8. The expansion valve according to claim 7, wherein, the shape memory alloy actuator is in direct contact with the fluid in the second fluid passage.

9. The expansion valve according to claim 1, wherein, the shape memory alloy actuator is in direct contact with the fluid in the second fluid passage.

10. The expansion valve according to claim 1, wherein, the valve element comprises a throttling element with a conical throttling tip.

11. A vapour compression system comprising an expansion valve according to claim 1, as well as an evaporator, wherein the first fluid passage is connected to the inlet of the evaporator and the evaporator outlet is connected to the second fluid passage.

12. The vapour compression system according to claim 11, wherein, the biasing force of the biasing member is equal but with opposite direction to the net pressure force acting on the valve element by the pressure differences between the first fluid passage and the second fluid passage in the close position of the expansion valve.

13. A method for controlling a vapour compression system according to claim 11, comprising the following steps:
providing an electric current to the shape memory alloy actuator to heat the shape memory alloy actuator above the temperature of the fluid in the second fluid passage,
adjusting the electric current to control the state of the refrigerant entering the second fluid passage.

14. The method according to claim 13, wherein, the electrical resistance of the shape memory alloy actuator is calculated from the measured electrical current provided to the shape memory alloy actuator at constant voltage.

15. The method according to claim 14, wherein, the electrical current provided to the shape memory alloy actuator is adjusted to keep the electrical resistance of the shape memory alloy actuator constant at a desired value.

16. The method according to claim 14, wherein, the vapour compression system comprises a control unit, which measures the electrical resistance of the shape memory alloy actuator and provides the electrical current for heating the shape memory alloy actuator.

17. The method according to claim 14 wherein, the electrical resistance of the shape memory alloy actuator is varied around the value of the electrical resistance of the shape memory alloy actuator at the phase transition from martensitic to austenitic phase.

18. The method according to claim 13, wherein, a hysteresis compensation is included when calculating the adjusted electrical current.

* * * * *